US009859978B2

(12) United States Patent
Liu et al.

(10) Patent No.: US 9,859,978 B2
(45) Date of Patent: Jan. 2, 2018

(54) SELF-ADAPTIVE RECEIVING METHOD, DEVICE, AND SYSTEM FOR RADIO SIGNAL

(71) Applicant: KUANG-CHI INTELLIGENT PHOTONIC TECHNOLOGY LTD., Shenzhen (CN)

(72) Inventors: Ruopeng Liu, Shenzhen (CN); Linyong Fan, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/449,937

(22) Filed: Mar. 4, 2017

(65) Prior Publication Data
US 2017/0180044 A1    Jun. 22, 2017

Related U.S. Application Data

(63) Continuation of application No. PCT/CN2015/086853, filed on Aug. 13, 2015.

(30) Foreign Application Priority Data

Sep. 5, 2014  (CN) .......................... 2014 1 0452730

(51) Int. Cl.
*H04B 10/11*      (2013.01)
*H04B 10/69*      (2013.01)
*H04B 10/50*      (2013.01)

(52) U.S. Cl.
CPC ........... *H04B 10/11* (2013.01); *H04B 10/502* (2013.01); *H04B 10/69* (2013.01)

(58) Field of Classification Search
CPC ...... H04B 10/11; H04B 10/69; H04B 10/502; H04B 10/1143; H04B 10/25758; H04B 10/25752; H04B 10/25753; H04J 14/0298
See application file for complete search history.

(56) References Cited

U.S. PATENT DOCUMENTS

| 4,481,676 | A |   | 11/1984 | Thomson |                       |
|-----------|---|---|---------|---------|-----------------------|
| 4,535,297 | A | * | 8/1985  | Puckette | ........ H04L 27/14  |
|           |   |   |         |         | 329/303               |
| 2008/0137724 | A1 | * | 6/2008 | Tanaka | ........ G06K 7/0008 |
|           |   |   |         |         | 375/238               |

FOREIGN PATENT DOCUMENTS

| CN | 102694597 A | 9/2012 |
|----|-------------|--------|
| CN | 102694598 A | 9/2012 |
| CN | 103812557 A | 5/2014 |

* cited by examiner

*Primary Examiner* — Ted Wang

(74) *Attorney, Agent, or Firm* — Perkins Coie LLP

(57) ABSTRACT

The present application relates to a self-adaptive receiving method, device, and system for a wireless signal, where the receiving method is characterized by: detecting an electric signal, and recording and storing a duration of each level of the electric signal; determining a decision time interval according to the duration of each level, where the decision time interval is used to determine a location of the spacing level between the electric signal groups of the electric signal; comparing the duration of each level with the decision time interval to recognize each electric signal group; when the duration of the level is less than the decision time interval, determining the level as the intragroup time interval and recording the data of the electric signal groups; and when the duration of the level is greater than or equal to the decision time interval, determining the level as the intergroup time interval and confirming an end of the electric signal groups.

16 Claims, 5 Drawing Sheets

SELF-ADAPTIVE RECEIVING METHOD, DEVICE, AND SYSTEM FOR RADIO SIGNAL

CROSS REFERENCE TO RELATED APPLICATIONS

This application is a continuation of PCT Application No. PCT/CN2015/086853 filed on Aug. 13, 2015, which claims priority to Chinese Patent Application No. 201410452730.5 of Sep. 5, 2014, both of which are incorporated herein by reference.

TECHNICAL FIELD

The present application relates to the communication field, and in particular, to a self-adaptive receiving method, device, and system for a wireless signal.

BACKGROUND

Wireless optical communication is a short-distance high-speed wireless optical communications technology that is developed based on a light emitting diode (LED) technology. A basic principle of wireless optical communication is to use flash of an LED light source to communicate by virtue of a characteristic that an LED lamp switches faster than a fluorescent lamp and an incandescent lamp. In short, light represents binary 1, and absence of light represents binary 0. After a high-speed optical signal that includes digital information undergoes optical-to-electric conversion, information can be obtained. In the wireless optical communications technology, data is hardly interfered with or captured, and an optical communications device is easily producible but is not easy to damage or degauss, and therefore, may be used to make a wireless optical encryption key. Compared with microwave technologies, the wireless optical communication has relatively rich spectrum resources, which is incomparable with general microwave communication and wireless communication. In addition, the wireless optical communication is compatible with any communications protocol and applicable to any environment. In terms of security, compared with conventional magnetic materials, the wireless optical communication is free from a degaussing problem, without any need to worry about theft of communication content. A wireless optical communications device is flexible, portable, cost-efficient, and suitable for massive popularized application.

With rapid popularization of wireless optical communication, a technology of sending a wireless optical signal by using an LED lamp of a portable electronic device such as a mobile phone has been proposed. When the LED lamp in the portable electronic device is turned on or off, an on duration or an off duration changes randomly, but the durations may be controlled within a specific range. Therefore, a wireless optical signal that represents data information may be sent by the LED lamp of the terminal by using a specially set encoding mode.

Wireless optical communication has a broad application prospect in various fields. Currently, a relatively mature application is an access control system. The Chinese patent application CN102682505 discloses a method for applying an LED wireless optical communications technology to access control identity authentication, and the Chinese patent application CN102693567 discloses a communication encoding and decoding method for this access control system.

However, on one hand, because a brightness duration and a dimness duration of an optical signal sent by the LED lamp of the portable electronic device change randomly, a recognition ratio of the optical signal is relatively low. On the other hand, strobe features of LED lamps in different electronic devices are different, and a value range of a receiving parameter that is set on at a receive end of light is largely widened to adapt to a transmit end, which reduces performance of some portable electronic devices with excellent strobe features in order to adapt to the receiving parameter. Even so, there are still portable electronic devices that mismatch the parameter, and their signal recognition ratio is still relatively low. Moreover, when the parameter of the optical signal sent by the LED lamp changes, the receive end needs upgrading, which makes system upgrade and maintenance become very complicated.

Technical Problem

In the prior art, a receive end of light recognizes an optical signal sent by an LED lamp of a portable electronic device at a low recognition ratio, and system upgrade and maintenance of the receive end of light are complicated.

Technical Solution

To resolve the foregoing technical problem, a self-adaptive receiving method for a radio optical signal is proposed as a technical solution in the present application, including the following steps:

receiving a wireless signal and converting the wireless signal into an electric signal, where the electric signal includes multiple electric signal groups, a duration of a level in each electric signal group is an intragroup time interval, a spacing level exists between adjacent electric signal groups, and a duration of the spacing level is an intergroup time interval;

detecting the electric signal, and recording and storing a duration of each level of the electric signal;

determining a decision time interval according to the duration of each level, where the decision time interval is used to determine a location of the spacing level between the electric signal groups of the electric signal;

comparing the duration of each level with the decision time interval to recognize each electric signal group;

converting each received electric signal group into a data group; and combining multiple data groups into data.

To resolve the foregoing technical problem, a self-adaptive receiving device for a wireless signal is proposed as another technical solution in the present application, including:

a module for receiving a wireless signal and converting the wireless signal into an electric signal, where the electric signal includes multiple electric signal groups, a duration of a level in each electric signal group is an intragroup time interval, a spacing level exists between adjacent electric signal groups, and a duration of the spacing level is an intergroup time interval;

a module for detecting the electric signal, and recording and storing a duration of each level of the electric signal;

a module for determining a decision time interval according to the duration of each level, where the decision time interval is used to determine a location of the spacing level between the electric signal groups of the electric signal;

a module for comparing the duration of each level with the decision time interval to recognize each electric signal group;

a module for converting each received electric signal group into a data group; and a module for combining multiple data groups into data.

To resolve the foregoing technical problem, a controlled end is proposed as another technical solution in the present application, where the controlled end includes an aforementioned self-adaptive receiving device for a wireless signal.

To resolve the foregoing technical problem, an authentication system is proposed as another technical solution in the present application, where the authentication system includes an aforementioned controlled end.

To resolve the foregoing technical problem, an authentication system is proposed as another technical solution in the present application, where the authentication system includes an aforementioned self-adaptive receiving device for a wireless signal.

The present application further proposes a self-adaptive receiving device for a wireless signal, including:

a module for receiving a wireless signal and converting the wireless signal into an electric signal, where the electric signal includes multiple electric signal groups, a duration of a level in each electric signal group is an intragroup time interval, a spacing level exists between adjacent electric signal groups, a duration of the spacing level is an intergroup time interval, and the intragroup time interval is less than the intergroup time interval;

a module for detecting the electric signal, and recording and storing a duration of each level of the electric signal;

a module for determining a decision time interval according to the duration of each level, where the decision time interval is used to determine a location of the intergroup time interval between the electric signal groups of the electric signal;

a module for comparing the duration of each level with the decision time interval to recognize each electric signal group, where when the duration of the level is less than the decision time interval, the level is determined as the intragroup time interval and the data of the electric signal groups is recorded; and when the duration of the level is greater than or equal to the decision time interval, the level is determined as the intergroup time interval and an end of the electric signal groups is confirmed;

a module for converting each received electric signal group into a data group; and a module for combining multiple data groups into data.

The present application further provides a controlled end, including the aforementioned self-adaptive receiving device for a wireless signal.

The present application further proposes an authentication system, including the aforementioned controlled end.

The present application further provides an authentication system, including the aforementioned self-adaptive receiving device for a wireless signal.

Beneficial Effects

According to the foregoing technical solution of the present application, a decision time interval of a receive end can be set adaptively according to a received wireless signal, and reception of the wireless signal is implemented. Based on this method, optical signals sent by LED lamps of most transmit ends can be received adaptively. Moreover, when parameters of the optical signals from the transmit end change, the receive end does not need upgrading. In addition, a recognition ratio of the optical signals is improved.

BRIEF DESCRIPTION OF DRAWINGS

To make objectives, features, and advantages of the present application more comprehensible, the following describes specific embodiments of the present application in detail with reference to accompanying drawings.

DESCRIPTION OF EMBODIMENTS

Figure 1:
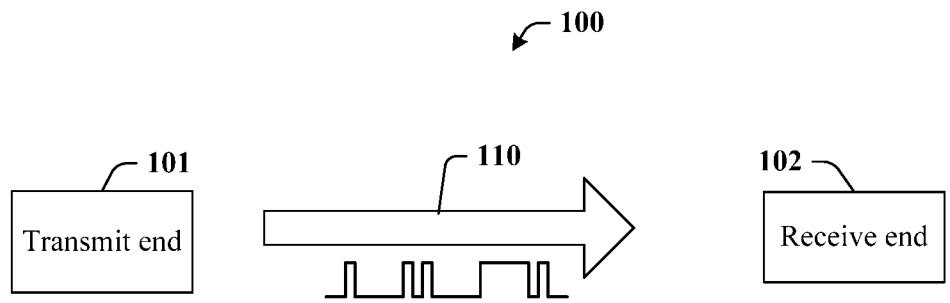
FIG. 1 is a system block diagram of a visible light communications system according to an embodiment of the present application.

In summary, a self-adaptive receiving method based on optical communication of an LED lamp is provided in embodiments of the present application.

As found in tests on the LED lamp of a portable electronic device, a random delay exists in controlling the flashing of the LED lamp. The delay of flash control makes it difficult to synchronize a transmit end with a signal end. According to a conventional technology, the LED lamp flashes intermittently at a high frequency to perform communication, in which light represents binary 1 and absence of light represents binary 0. However, for lack of accurate synchronization, error bits are received if light represents binary 1 and absence of light represents binary 0. For example, after a duration of a light absence state that represents one binary bit 0 exceeds a specified value, the state is recognized as another binary bit 0 in a surplus duration.

A group coding mode is expected to resolve the problem. That is, in encoding, to-be-sent data may be divided into multiple data groups, and each data group includes one or more bits. Then the data groups are converted into multiple electric signal groups, and each electric signal group uses a quantity of level jumps or a quantity of levels to represent bits of a corresponding data group. A spacing level is used to denote a spacing between adjacent electric signal groups. A level jump may include only a jump from a low level to a high level, or include only a jump from a low level to a high level, and may include both a jump from a low level to a high level and a jump from a low level to a high level. Levels that denote one bit in an electric signal group may be all high levels or may be all low levels, but it may be a different case with levels in the electric signal group.

A level duration (herein called an intragroup time interval) in each electric signal group and a level duration (herein called an intergroup time interval) between adjacent electric signal groups may be preset. The intergroup time interval is greater than the intragroup time interval to such an extent that the receive end can perform recognition correctly.

At the receive end, when the detected level duration is less than or equal to the intragroup time interval, it is determined that the electric signal group still continues; and when the detected level duration is greater than or equal to the intergroup time interval, it is determined that the electric signal group is ended.

In this mode, delimitation between electric signal groups makes recognition of continuous bits occur in only a single electric signal group. In this short time, a probability of signal recognition errors caused by a random delay is reduced significantly. Therefore, this mode improves communication reliability.

It should be noted that although the intergroup time interval has advantages, the setting of the intergroup time interval consumes additional transmission time. Especially, when the LED lamp controls the intergroup time interval (that is, sends a brightness or dimness signal), a random delay exists, and different LED lamps have different delay characteristics. To recognize an optical signal sent by a terminal that has a long delay of brightness and dimness of the LED lamp, the decision time interval of the receive end needs to be increased to an enough extent, and a terminal that has a short delay of brightness and dimness of the LED lamp needs to extend the duration of the optical signal to meet the decision time interval, which prolongs the transmission time of the optical signal. In another aspect, after the decision time interval of the receive end is set, if the intergroup time interval of the optical signal sent by the transmit end changes, the receive end needs to be upgraded, and the decision time interval of the receive end needs to be reset, which leads to inconvenience of subsequent upgrade and maintenance.

According to the embodiments of the present application, at the time of detecting an received electric signal, a duration of each level of the electric signal is recorded and stored. A decision time interval is determined automatically according to the duration of each level, where the decision time interval is used to determine a location of the spacing level between the electric signal groups of the electric signal. Then the duration of each level is compared with the decision time interval to recognize each electric signal group; when the duration of the level is less than the decision time interval, the level is determined as an intragroup level and the data of the electric signal groups is recorded; and when the duration of the level is greater than or equal to the decision time interval, the level is determined as a spacing level, and an end of the electric signal groups is confirmed.

In this way, by adaptively setting the decision time interval, the receive end can well adapt to various transmit ends, and a fixed decision time interval does not need to be set any longer, and the decision time interval does not need to be updated any longer.

Certainly, in another embodiment, the intragroup time interval is greater than the intergroup time interval; when the duration of the level is greater than or equal to the decision time interval, the level is determined as the intragroup time interval and the data of the electric signal groups is recorded; and when the duration of the level is less than or equal to the decision time interval, the level is determined as the intergroup time interval and an end of the electric signal groups is confirmed.

With reference to accompanying drawings, the following describes the present application that claims protection. The same reference numeral is used in all accompanying drawings to denote the same part or step. For a purpose of interpretation, the following discloses details to enable comprehensive understanding about the subject that claims protection. However, it is apparent that the invention may be implemented without using such details.

First Embodiment

The sending and receiving processes in this embodiment may be implemented on various electronic devices. FIG. 1 is a system block diagram of an optical communications system according to an embodiment of the present application. The communications system 100 includes a transmit end 101 and a receive end 102. The transmit end 101 sends an optical signal to the receive end 102. The transmit end 101 may be one of various portable electronic devices. Examples of the portable electronic devices include but are not limited to a mobile phone, a tablet, and a special-purpose communications terminal.

Figure 2:
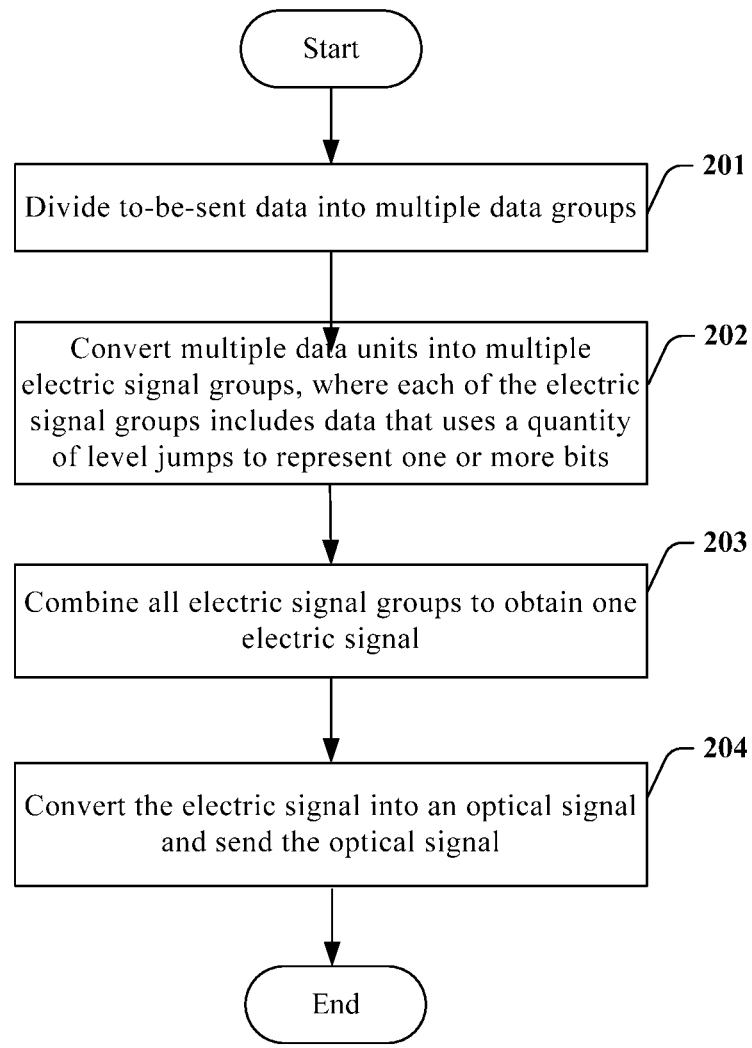
FIG. 2 is a flowchart of sending an optical signal according to a first embodiment of the present application.

Refer to FIG. 2, which is a flowchart of sending an optical signal according to a first embodiment of the present application, the encoding method includes the following steps:

Step 201: Divide to-be-sent data into multiple data groups, where each data group includes one or more bits. The to-be-sent data may be text, picture, audio and/or video.

Step 202: Convert the multiple data groups into multiple electric signal groups. Each of the electric signal group includes data that uses a quantity of level jumps to represent one or more bits of a corresponding data group.

In each data group, data is separated by a relatively short level duration (named intragroup time interval), and two adjacent groups are separated by a relatively long duration (named intergroup time interval). A time interval that denotes an end of a sent signal is an end time interval. The intragroup time interval, the intergroup time interval and the end time interval are set separately. For example, the intragroup time interval is set to 2 ms, and the intergroup time interval is set to 30 ms.

In this embodiment, a rising edge or a falling edge of a level is used as a start of a jump.

For example, a duration of a high (or low) level in an electric signal group is 2 ms. Each electric signal group has four level jumps, including a jump from a low level to a high level and a jump from a high level to a low level. Each electric signal group denotes 2-bit information, and four electric signal groups combine into one byte. When a quantity of jumps from a low level to a high level and jumps from a high level to a low level in an electric signal group is 1, it represents information 00; when the quantity of jumps from a low level to a high level and jumps from a high level to a low level is 2, it represents information 01; when the quantity of jumps from a low level to a high level and jumps from a high level to a low level is 3, it represents information 10; and when the quantity of jumps from a low level to a high level and jumps from a high level to a low level is 4, it represents information 11. Table 1 shows a relationship between the quantity of jumps from a low level to a high level and jumps from a high level to a low level and information represented by the quantity.

TABLE 1

| | Quantity of high-low level jumps | | | |
|---|---|---|---|---|
| | 1 | 2 | 3 | 4 |
| Information (2 bits) | 00 | 01 | 10 | 11 |

Therefore, a level combination of an electric signal group corresponding to an information element may be determined according to the foregoing preset correspondence table.

Certainly, each electric signal group may denote 1-bit information. In this case, at most 2 jumps are required. By analogy, each electric signal group may denote 3-bit information. In this case, at most 8 jumps are required.

The foregoing table also shows that even the bit value 00 corresponds to one level jump.

In addition, the duration of the spacing level between two adjacent electric signal groups is greater than the duration of a level in the electric signal group, and may be set to 30 ms. In this embodiment, spacing levels include a high level and a low level. That is, a high level or a low level may be used as a spacing between two adjacent electric signal groups. Evidently, the spacing level that represents a spacing between electric signal groups is of the same type as the level that represents the data in the electric signal groups.

Step 203: Combine all electric signal groups to obtain one electric signal.

Figure 4:
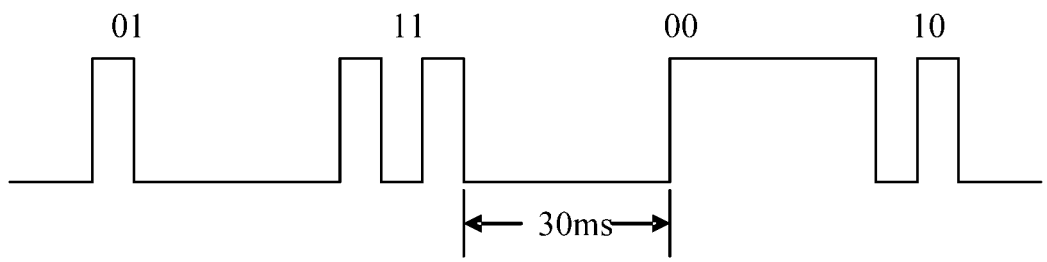
FIG. 4 shows an exemplary encoded electric signal in optical communication according to a first embodiment of the present application.

FIG. 4 shows an exemplary encoded electric signal and gives a schematic diagram of a relationship between a bit value and a level, in which four electric signal groups have 2, 4, 1, and 3 level jumps respectively and represent 01, 11, 00, and 10 respectively. A level jump refers to a jump from a low level to a high or a jump from a high level to a low level. The duration of a high level or a low level between two adjacent electric signal groups is 31 ms, and the signal obtained by combining the electric signal groups is one byte, and is denoted by binary 01110010, which corresponds to a hexadecimal signal 0x72.

Step 204: Convert the electric signal into an optical signal and send the optical signal.

The electric signal controls a light emitting diode to send information in the form of an optical signal.

Figure 3:
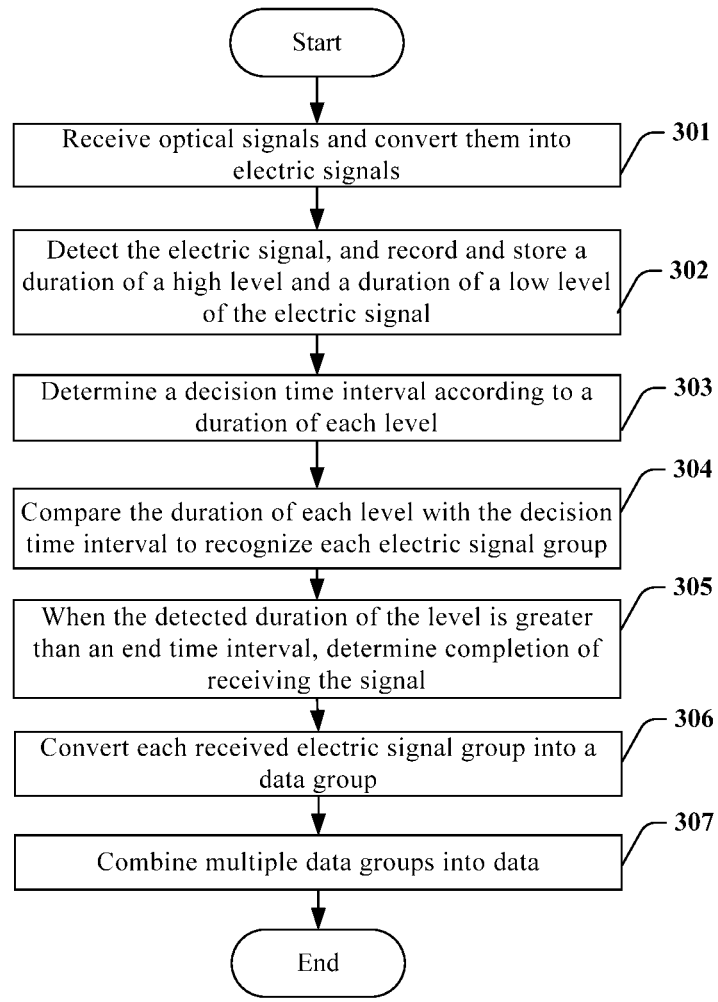
FIG. 3 is a flowchart of a method for adaptively receiving an optical signal according to a first embodiment of the present application.

Refer to FIG. 3, which is a flowchart of a method for receiving an optical signal according to a first embodiment of the present application. The receiving method includes the following steps.

Step 301: Receive an optical signal and convert the optical signal into an electric signal.

The electric signal is the sent electric signal described above. The electric signal includes multiple electric signal groups, a duration of a high level or a low level in each electric signal group is an intragroup time interval, a high or low level that continues for a specific duration exists between adjacent electric signal groups, and the specific duration is an intergroup time interval. The intragroup time interval is less than the intergroup time interval.

Step 302: Detect the electric signal, and record and store a duration of a high level and a duration of a low level of the electric signal.

Specifically, when detecting a jump from a low level to a high level or a jump from a high level to a low level, the receive end 102 starts counting, reading, calculating, and storing the duration of each high level and each low level.

Step 303: Determine a decision time interval according to the duration of each level, where the decision time interval is used to determine a location of a spacing level between electric signal groups of the electric signal.

A method for determining a decision time interval according to the duration of each level is: for an electric signal with N electric signal groups, reading N−1 longest durations of a level, and then setting the decision time interval to be equal to or less than (generally, slightly less than) a minimum duration in the N−1 longest durations, where N is a natural number greater than 1.

In this embodiment, because the spacing level between electric signal groups is the same as the level in the electric signal groups, in order to determine the decision time interval, durations of all levels need to be compared, and N−1 longest durations of the levels need to be found and used as N−1 durations of spacing levels. In this way, the decision time interval is determined.

Step 304: Compare the duration of each level with the decision time interval to recognize each electric signal group;

when the duration of the level is less than the decision time interval, determine the level as the intragroup time interval and record a quantity of jumps of a level that represents data; and when the duration of the level is greater than or equal to the decision time interval, determine the level as the intergroup time interval and confirm an end of the electric signal groups.

Step 305: When the detected duration of the level is greater than or equal to an end time interval, determine completion of receiving the signal.

Step 306: Convert each received electric signal group into a data group.

Step 307: Combine multiple data groups into data.

For example, the decision time interval and the signal end time interval are set to 30 ms and 100 ms respectively. When a rising edge (or a falling edge) is detected, timing starts. When the detected duration of a high or low level is less than 30 ms, the quantity of jumps from a low level to a high level and the quantity of jumps from a high level to a low level are recorded. When the detected duration of a high or low level is greater than or equal to 30 ms and less than 100 ms, the level is regarded as an end of the electric signal groups. When the detected duration of a high or low level is greater than or equal to 100 ms, it is deemed that the signal receiving is completed.

In another circumstance, when the duration of a high (or low) level is greater than or equal to the end time interval, it may indicate that the signal receiving is interrupted, and signal detection is started again.

In this embodiment, types of the optical signal may include an infrared optical signal, a visible light signal, and an ultraviolet light signal.

Therefore, the decision time interval is set adaptively by using the method in this embodiment, which prevents the transmit end from setting a universally applicable decision time interval and prevents from setting a fixed decision time interval for the receive end, and avoids the risk of inconvenient upgrade.

Second Embodiment

The sending and receiving processes in this embodiment may be implemented on various electronic devices. A transmit end may be one of various portable electronic devices. Examples of the portable electronic devices include but are not limited to a mobile phone, a tablet, and a special-purpose communications terminal.

Figure 5:
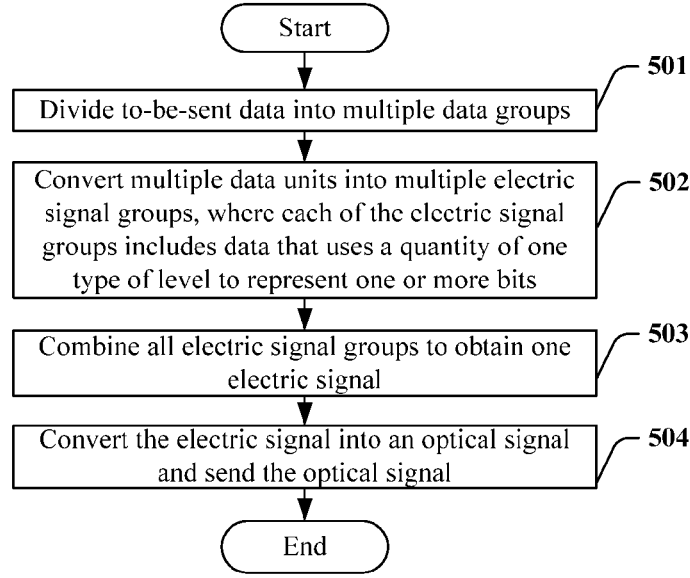
FIG. 5 is a sending flowchart for optical communication according to a second embodiment of the present application.

Refer to FIG. 5, which is a flowchart of sending an optical signal according to a first embodiment of the present application, the encoding method includes the following steps:

Step 501: Divide to-be-sent data into multiple data groups, where each data group includes one or more bits. The to-be-sent data may be text, picture, audio and/or video.

Step 502: Convert the multiple data groups into multiple electric signal groups. Each of the electric signal groups includes data that uses a quantity of one type of level to represent one or more bits of a corresponding data group.

A spacing level exists between adjacent electric signal groups. The duration of the spacing level is an intergroup time interval, and the duration of a level in each electric signal group is greater than an intragroup time interval. The intragroup time interval is less than the intergroup time interval.

For example, each electric signal group uses the quantity of high levels to represent one or more bits, and a spacing denoted by a low level exists between adjacent electric signal groups.

For example, the duration of a level in an electric signal group is 2 ms, each electric signal group has at most four high levels, each electric signal group denotes 2-bit information, and four electric signal groups combine into one byte. When the quantity of high levels in an electric signal group is 1, it represents information 00; when the quantity of high levels is 2, it represents information 01; when the quantity of high levels is 3, it represents information 10; and when the quantity of high levels is 4, it represents information 11. Table 2 shows a correspondence between the quantity of high levels and information represented by the quantity.

TABLE 2

|  | Quantity of high levels | | | |
| --- | --- | --- | --- | --- |
|  | 1 | 2 | 3 | 4 |
| Information (2 bits) | 00 | 01 | 10 | 11 |

Certainly, each electric signal group may denote 1-bit information. In this case, at most 2 high levels are required. By analogy, each electric signal group may denote 3-bit information. In this case, at most 8 high levels are required.

In addition, the duration of the spacing level between two adjacent electric signal groups is greater than the duration of a level in the electric signal group, and may be set to 30 ms. In this embodiment, spacing levels include a low level. That is, only a low level can be used as a spacing between two adjacent electric signal groups. Evidently, the spacing level that represents a spacing between electric signal groups is of the same type as one of the levels that represent the data in the electric signal groups. In this way, the detection of level duration is limited to only low levels, which reduces the range of detected levels.

Step 503: Combine all electric signal groups to obtain one electric signal.

Figure 7:
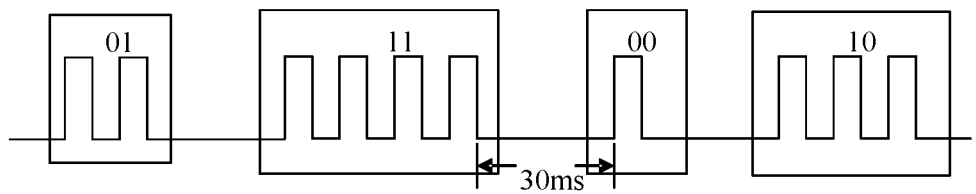
FIG. 7 shows an exemplary encoded electric signal in optical communication according to a second embodiment of the present application.

FIG. 7 shows an exemplary encoded electric signal and gives a schematic diagram of a relationship between a bit value and a level, in which four electric signal groups have 2, 4, 1, and 3 high levels respectively and represent 01, 11, 00, and 10 respectively. The duration of a low level between two adjacent electric signal groups is 30 ms, and the signal obtained by combining the electric signal groups is one byte, and is denoted by binary 01110010, which corresponds to a hexadecimal signal 0x72.

Step 504: Convert the electric signal into an optical signal and send the optical signal.

The electric signal controls a light emitting diode to send information in the form of an optical signal.

Figure 6:
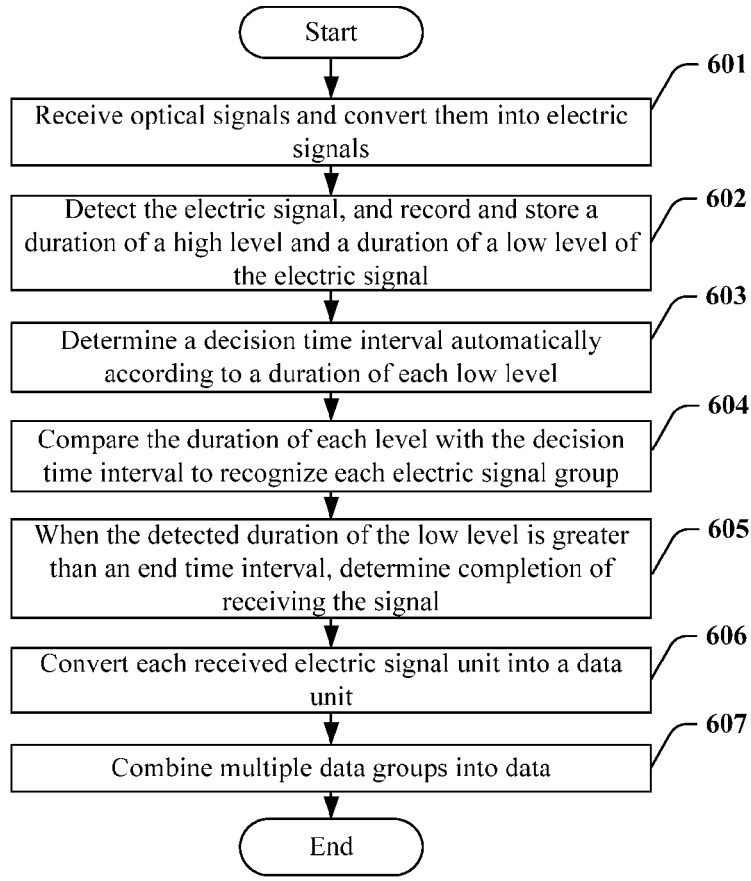
FIG. 6 is a flowchart of a self-adaptive receiving method in optical communication according to a second embodiment of the present application.

Refer to FIG. 6, which is a flowchart of a method for receiving an optical signal according to a second embodiment of the present application. The receiving method includes the following steps.

Step 601: Receive an optical signal and convert the optical signal into an electric signal.

The electric signal is the sent electric signal described above. The electric signal includes multiple electric signal groups, a duration of a high level or a low level in each electric signal group is an intragroup time interval, a low level exists between adjacent electric signal groups, and the duration of the low level is an intergroup time interval. The intragroup time interval is less than the intergroup time interval.

Step 602: Detect the electric signal, record and store a duration of a high level and a duration of a low level of the electric signal.

Specifically, when detecting a jump from a low level to a high level, the receive end 102 starts counting, reading, calculating, and storing the duration of each high level and each low level.

Step 603: Determine a decision time interval according to the duration of each low level, where the decision time interval is used to determine a location of a spacing level between electric signal groups of the electric signal.

A method for determining a decision time interval according to the duration of each level is: for an electric signal with N electric signal groups, reading N−1 longest durations of the low level, and then setting the decision time interval to be equal to or less than (generally, slightly less than) a minimum duration in the N−1 longest durations, where N is a natural number greater than 1.

In this embodiment, because the spacing level between electric signal groups is the same as only one type of level in the electric signal groups, in order to determine the decision time interval, durations of only low levels need to be compared, and N−1 longest durations of the low levels can be found to determine the decision time interval.

Step 604: Compare the duration of each level with the decision time interval to recognize each electric signal group; when the duration of the level is less than the decision time interval, determine the level as the intragroup time interval and record a quantity of jumps of a level that represents data; and when the duration of the level is greater than the decision time interval, determine the level as the intergroup time interval and confirm an end of the electric signal groups.

Step 605: When the detected duration of the low level is greater than an end time interval, determine completion of receiving the signal.

Step 606: Convert each received electric signal group into a data group.

Step 607: Combine multiple data groups into data.

For example, the decision time interval and the signal end time interval are set to 30 ms and 100 ms respectively. When a rising edge (or a falling edge) is detected, timing starts. When the detected duration of a high or low level is less than 30 ms, the quantity of high levels is recorded. When the detected duration of a low level is greater than or equal to 30 ms and less than 100 ms, the level is regarded as an end of the electric signal groups. When the detected duration of a low level is greater than or equal to 100 ms, it is deemed that the signal receiving is completed.

In another circumstance, when the duration of a high (or low) level is greater than the end time interval, it may indicate that the signal receiving is interrupted, and signal detection is started again.

In this embodiment, types of the optical signal may include an infrared optical signal, a visible light signal, and an ultraviolet light signal.

Therefore, the decision time interval is set adaptively by using the method in this embodiment, which prevents the transmit end from setting a universally applicable decision time interval and prevents from setting a fixed decision time interval for the receive end, and avoids the risk of inconvenient upgrade.

Third Embodiment

The sending and receiving processes in this embodiment may be implemented on various electronic devices. The transmit end may be one of various portable electronic devices. Examples of the portable electronic devices include but are not limited to a mobile phone, a tablet, and a special-purpose communications terminal.

Figure 8:
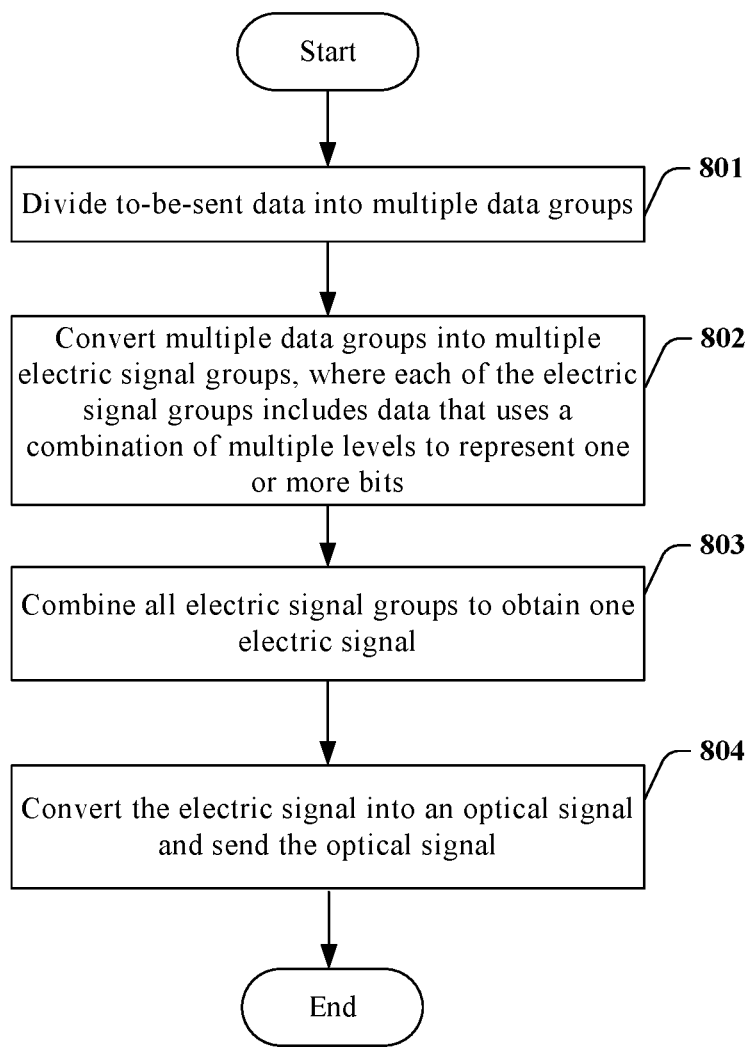
FIG. 8 is a sending flowchart for optical communication according to a third embodiment of the present application.

Refer to FIG. 8, which is a flowchart of sending an optical signal according to a third embodiment of the present application, the encoding method includes the following steps:

Step 801: Divide to-be-sent data into multiple data groups, where each data group includes one or more bits. The to-be-sent data may be text, picture, audio and/or video.

Step 802: Convert the multiple data groups into multiple electric signal groups. Each of the electric signal groups includes data that uses a combination of multiple levels to represent one or more bits of a corresponding data group.

A spacing level exists between adjacent electric signal groups. The duration of the spacing level is an intergroup time interval, and the duration of a level in each electric signal group is an intragroup time interval. The intragroup time interval is less than the intergroup time interval.

In this embodiment, the electric signal groups are denoted by three levels such as 0, 1V, and 2V. A first level such as 0V is set as a reference level and is used to denote a spacing between adjacent electric signal groups. Other two levels such as 1V and 2V are used to combine together in the electric signal groups to represent 2 bits. Specifically, in an electric signal group, when the level jumps from 0V to 1V and then jumps from 1V to 0V, the level represents information 00; when the level jumps from 0V to 2V and then jumps from 2V to 0V, the level represents 01; when the level jumps from 0V to 1V and then jumps from 1V to 2V and then jumps from 2V to 0, the level represents information 10; and when the level jumps from 0V to 2V and then jumps from 2V to 1V and then jumps from 1V to 0V, the level represents information 11. Table 3 shows a correspondence between each level combination and information represented by the level combination.

TABLE 3

|  | Level combination | | | |
| --- | --- | --- | --- | --- |
|  | 1 | 2 | 12 | 21 |
| Signal (2 bits) | 00 | 01 | 10 | 11 |

Each electric signal denotes 2-bit information, and information of four electric signal groups combine into one byte.

Therefore, a level combination of an electric signal group corresponding to an information element may be determined according to the foregoing preset correspondence table.

One of the foregoing three levels may be freely specified as a first level, and specific values of the three levels may be set flexibly. For example, the three levels are set to 1V, 2V, and 3V. Specific information represented by the level combination may also be set flexibly. For example, a level combination 1 represents information 01, a level combination 2 represents information 00, a level combination 12 represents information 10, and a level combination 21 represents information 11.

In addition, the duration of the spacing level between two adjacent electric signal groups is greater than the duration of a level in the electric signal group, and may be set to 30 ms. In this embodiment, spacing levels include a reference level. That is, only a reference level can be used as a spacing between two adjacent electric signal groups. Evidently, the spacing level that represents a spacing between electric signal groups is of the same type as one of the levels that represent the data in the electric signal groups. However, understandably, another level that is different from levels in the electric signal groups may be set additionally for the spacing level, which brings an advantage of recognizing the spacing level conveniently.

Step 803: Combine all electric signal groups to obtain one electric signal.

Figure 10:
FIG. 10 shows an exemplary encoded electric signal in optical communication according to a third embodiment of the present application.

FIG. 10 is a schematic diagram of a relationship between a signal and a level, in which four groups of signals represent 01, 11, 00, and 10 respectively. A 0V level is used to distinguish between two adjacent groups of signals, and the combined signal is a one byte and is denoted by binary 01110010.

Step 804: Convert the electric signal into an optical signal and send the optical signal.

The electric signal controls a light emitting diode to send information in the form of an optical signal.

Figure 9:
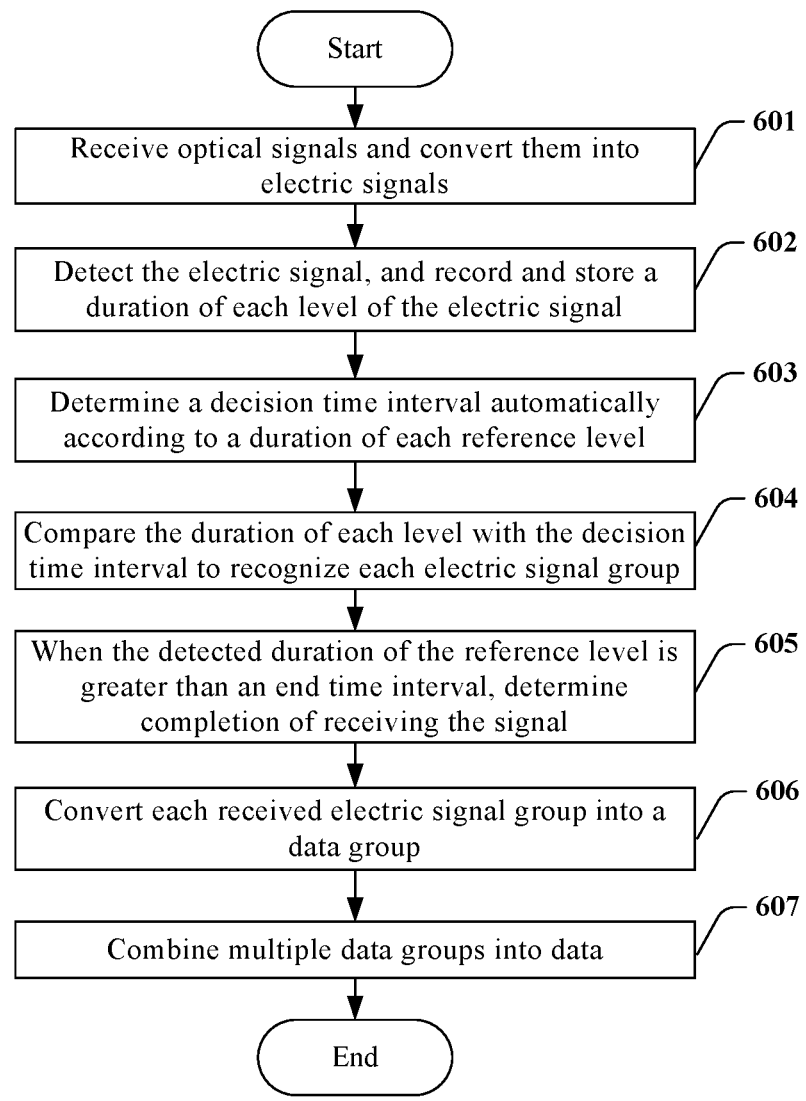
FIG. 9 is a flowchart of a self-adaptive receiving method in optical communication according to a third embodiment of the present application.

Refer to FIG. 9, which is a flowchart of a method for receiving an optical signal according to a third embodiment of the present application. The receiving method includes the following steps.

Step 901: Receive an optical signal and convert the optical signal into an electric signal.

The electric signal is the sent electric signal described above. The electric signal includes multiple electric signal groups, a duration of a high level or a low level in each electric signal group is an intragroup time interval, an intergroup time interval denoted by a low level that continues for a specific duration exists between adjacent electric signal groups. The intragroup time interval is less than the intergroup time interval.

Step 902: Detect the electric signal, and record and store durations of various levels of the electric signal.

Specifically, when detecting a level jump, the receive end 102 starts counting, reading, calculating, and storing each duration of various levels.

Step 903: Determine a decision time interval according to the duration of each reference level, where the decision time interval is used to determine a location of a spacing level between electric signal groups of the electric signal.

A method for determining a decision time interval according to the duration of each level is: for an electric signal with N electric signal groups, reading N−1 longest durations of the reference level, and then setting the decision time interval to be equal to or less than (generally, slightly less than) a minimum duration in the N−1 longest durations, where N is a natural number greater than 1.

In this embodiment, because the spacing level between electric signal groups is the same as only one type of level in the electric signal groups, in order to determine the decision time interval, durations of only reference levels need to be compared, and N−1 longest durations of the reference levels can be found to determine the decision time interval.

If the spacing level is different from all levels in the electric signal group, only N−1 spacing levels need to be found, and then the decision time interval is set to be equal to or less than (generally slightly less than) a minimum duration in the N−1 spacing levels.

Step 904: Compare the duration of each level with the decision time interval to recognize each electric signal group; when the duration of the level is less than the decision time interval, determine the level as the intragroup time interval and record a quantity of jumps of a level that represents data; and when the duration of the level is greater than or equal to the decision time interval, determine the level as the intergroup time interval and confirm an end of the electric signal groups.

Step 905: When the detected duration of the reference level is greater than an end time interval, determine completion of receiving the signal.

Step 906: Convert each received electric signal group into a data group.

Step 907: Combine multiple data groups into data.

For example, the decision time interval and the signal end time interval are set to 30 ms and 100 ms respectively. When a rising edge (or a falling edge) is detected, timing starts. When the detected duration of a level is less than 30 ms, a combination of various levels is recorded. When the detected duration of a reference level is greater than or equal to 30 ms and less than 100 ms, the level is regarded as an end of the electric signal groups. When the detected duration of a reference level is greater than or equal to 100 ms, it is deemed that the signal receiving is completed.

In another circumstance, when the duration of a reference level is greater than the end time interval, it may indicate that the signal receiving is interrupted, and signal detection is started again.

Therefore, the decision time interval is set adaptively by using the method in this embodiment, which prevents the transmit end from setting a universally applicable decision time interval and prevents from setting a fixed decision time interval for the receive end, and avoids the risk of inconvenient upgrade.

In this embodiment, types of the optical signal may include an infrared optical signal, a visible light signal, and an ultraviolet light signal.

In other embodiments of the present application, the electric signal group includes data that uses a combination of at least two of the following to represent one or more bits: a quantity of levels, a combination of multiple levels, and a quantity of level jumps.

The present application further proposes a self-adaptive receiving device for an optical signal, including:

a module for receiving an optical signal and converting the optical signal into an electric signal, where the electric signal includes multiple electric signal groups, a duration of a level in each electric signal group is an intragroup time interval, a spacing level exists between adjacent electric signal groups, a duration of the spacing level is an intergroup time interval, and the intragroup time interval is less than the intergroup time interval;

a module for detecting the electric signal, and recording and storing a duration of each level of the electric signal;

a module for determining a decision time interval according to the duration of each level, where the decision time interval is used to determine a location of the spacing level between the electric signal groups of the electric signal;

a module for comparing the duration of each level with the decision time interval to recognize each electric signal group, where when the duration of the level is less than the decision time interval, the level is determined as the intragroup time interval and the data of the electric signal groups is recorded; and when the duration of the level is greater than or equal to the decision time interval, the level is determined as the intergroup time interval and an end of the electric signal groups is confirmed;

a module for converting each received electric signal group into a data group; and a module for combining multiple data groups into data.

In the device, each of the electric signal groups includes data that uses a quantity of one type of level to represent one or more bits.

In the device, the electric signal group includes data that uses a combination of at least two levels to represent one or more bits.

In the device, the electric signal group includes data that uses a quantity of level jumps to represent one or more bits.

In the device, the spacing level is different from the levels in the electric signal group.

In the device, the spacing level is the same as at least one type of level in the electric signal group.

In the device, spacing levels include a high level and a low level.

The device further includes a module for determining an end of the electric signal when the duration of the level is greater than or equal to a preset end time interval.

In the device, the module for method for determining a decision time interval according to the duration of each level is configured to: for an electric signal with N electric signal groups, read N−1 longest durations of the level, and then set the decision time interval to be equal to or less than (generally, slightly less than) a minimum duration in the N−1 longest durations.

The present application further provides a controlled end, including the aforementioned self-adaptive receiving device for a optical signal.

The present application further proposes an authentication system, including the aforementioned controlled end.

The present application further provides an authentication system, including the aforementioned self-adaptive receiving device for an optical signal.

The self-adaptive receiving method, device and system for an optical signal according to the present application can adaptively set parameters at the receive end according to a received optical signal, and implement reception of the optical signal. By using this method, optical signals sent by LED lamps of most transmit ends can be received adaptively. When parameters of the optical signals from the transmit end change, the receive end does not need upgrading. In addition, the recognition ratio of visible light signals is improved.

Although the foregoing embodiments use an optical signal to describe the present application, but it is understandable that the present application may also be implemented by using an acoustic signal. The acoustic signal may be an infrasonic signal, an audible wave signal, or an ultrasonic signal. Therefore, the embodiments of the present application are applicable to various wireless signals such as the optical signal and the acoustic signal.

Although the present application is described in detail with reference to specific embodiments, a person of ordinary skill in the art should understand that the foregoing embodiments are intended for describing the present application only, and that various equivalent changes or replacements may be made without departing from the spirit of the present application. Therefore, all changes or variations made to the foregoing embodiments without departing from the spirit of the present application shall still fall within the scope of the claims of the present application.

What is claimed is:

1. A self-adaptive receiving method for a wireless signal, comprising the following steps:
   receiving a wireless signal and converting the wireless signal into an electric signal, the electric signal comprising multiple electric signal groups, a duration of a level in each electric signal group is an intragroup time interval, a spacing level exists between adjacent electric signal groups, and a duration of the spacing level is an intergroup time interval;
   detecting the electric signal, and recording and storing a duration of each level of the electric signal;
   determining a decision time interval according to the duration of each level, the decision time interval is used to determine a location of the spacing level between the electric signal groups of the electric signal;
   comparing the duration of each level with the decision time interval to recognize each electric signal group;
   converting each received electric signal group into a data group; and
   combining multiple data groups into data.

2. The method according to claim 1, wherein the intragroup time interval is less than the intergroup time interval; when the duration of the level is less than or equal to the decision time interval, the level is determined as the intragroup time interval and the data of the electric signal groups is recorded; and when the duration of the level is greater than or equal to the decision time interval, the level is determined as the intergroup time interval and an end of the electric signal groups is confirmed, and the step of determining a decision time interval according to the duration of each level comprises:
   for an electric signal with N electric signal groups, reading N−1 longest durations of each level, and then setting the decision time interval to be equal to or less than a minimum duration in the N−1 longest durations, the N is a natural number greater than 1.

3. The method according to claim 1, wherein the intragroup time interval is greater than the intergroup time interval; when the duration of the level is greater than or equal to the decision time interval, the level is determined as the intragroup time interval and the data of the electric signal groups is recorded; and when the duration of the level is less than or equal to the decision time interval, the level is determined as the intergroup time interval and an end of the electric signal groups is confirmed, the step of determining a decision time interval according to the duration of each level comprises:
   for an electric signal with N electric signal groups, reading N−1 shortest durations of each level, and then setting the decision time interval to be equal to or greater than a maximum duration in the N−1 shortest durations, the N is a natural number greater than 1.

4. The method according to claim 1, wherein the electric signal group comprises bit data represented by levels that are in different states.

5. The method according to claim 4, wherein the electric signal group comprises data that uses a quantity of levels to represent one or more bits, or the electric signal group comprises data that uses a combination of multiple levels to represent one or more bits, or the electric signal group comprises data that uses a quantity of level jumps to represent one or more bits, or the electric signal group comprises data that uses a combination of at least two of the following to represent one or more bits: a quantity of levels, a combination of multiple levels, and a quantity of level jumps.

6. The method according to claim 1, wherein the spacing level is the same as at least one level in the electric signal group.

7. The method according to claim 1, wherein the spacing level comprises a high level and a low level.

8. The method according to claim 1, further comprising: determining an end of the electric signal when the duration of the level is greater than or equal to a preset end time interval.

9. The method according to claim 1, wherein the wireless signal is an optical signal or an acoustic signal, the optical signal comprises an infrared optical signal, a visible light signal, and an ultraviolet light signal, and the acoustic signal comprises an infrasonic signal, an audible wave signal, and an ultrasonic wave signal.

10. A self-adaptive receiving device for a wireless signal, comprising:
    a module for receiving a wireless signal and converting the wireless signal into an electric signal, wherein the electric signal comprises multiple electric signal groups, a duration of a level in each electric signal group is an intragroup time interval, a spacing level exists between adjacent electric signal groups, and a duration of the spacing level is an intergroup time interval;
    a module for detecting the electric signal, and recording and storing a duration of each level of the electric signal;
    a module for determining a decision time interval according to the duration of each level, and the decision time interval is used to determine a location of the spacing level between the electric signal groups of the electric signal;
    a module for comparing the duration of each level with the decision time interval to recognize each electric signal group;
    a module for converting each received electric signal group into a data group; and
    a module for combining multiple data groups into data.

11. The device according to claim 10, wherein when the duration of the level is less than the decision time interval, the level is determined as the intragroup time interval and the data of the electric signal groups is recorded; and when the duration of the level is greater than or equal to the decision time interval, the level is determined as the intergroup time interval and an end of the electric signal groups is confirmed, and the module for determining a decision time interval according to the duration of each level reads N−1 longest durations of the spacing level for the electric signal with N electric signal groups, and then sets the decision time interval to be equal to or less than a minimum duration in the N−1 longest durations.

12. The device according to claim 10, wherein when the duration of the level is greater than the decision time interval, the level is determined as the intragroup time interval and the data of the electric signal groups is recorded;

and when the duration of the level is less than or equal to the decision time interval, the level is determined as the inter-group time interval and an end of the electric signal groups is confirmed, and the module for determining a decision time interval according to the duration of each level reads N−1 shortest durations of the spacing level for the electric signal with N electric signal groups, and then sets the decision time interval to be equal to or greater than a maximum duration in the N−1 shortest durations.

13. The device according to claim 10, wherein the electric signal group comprises bit data represented by levels that are in different states.

14. The device according to claim 13, wherein the electric signal group comprises data that uses a quantity of levels to represent one or more bits, or the electric signal group comprises data that uses a combination of at least two levels to represent one or more bits, or the electric signal group comprises data that uses a quantity of level jumps to represent one or more bits, or the electric signal group comprises data that uses a combination of at least two of the following to represent one or more bits: a quantity of levels, a combination of multiple levels, and a quantity of level jumps.

15. The device according to claim 10, wherein the spacing level is different from a level in the electric signal group, or the spacing level is the same as at least one level in the electric signal group.

16. The device according to claim 10, wherein the spacing level comprises at least one of a high level and a low level.

* * * * *